Patented Feb. 19, 1946

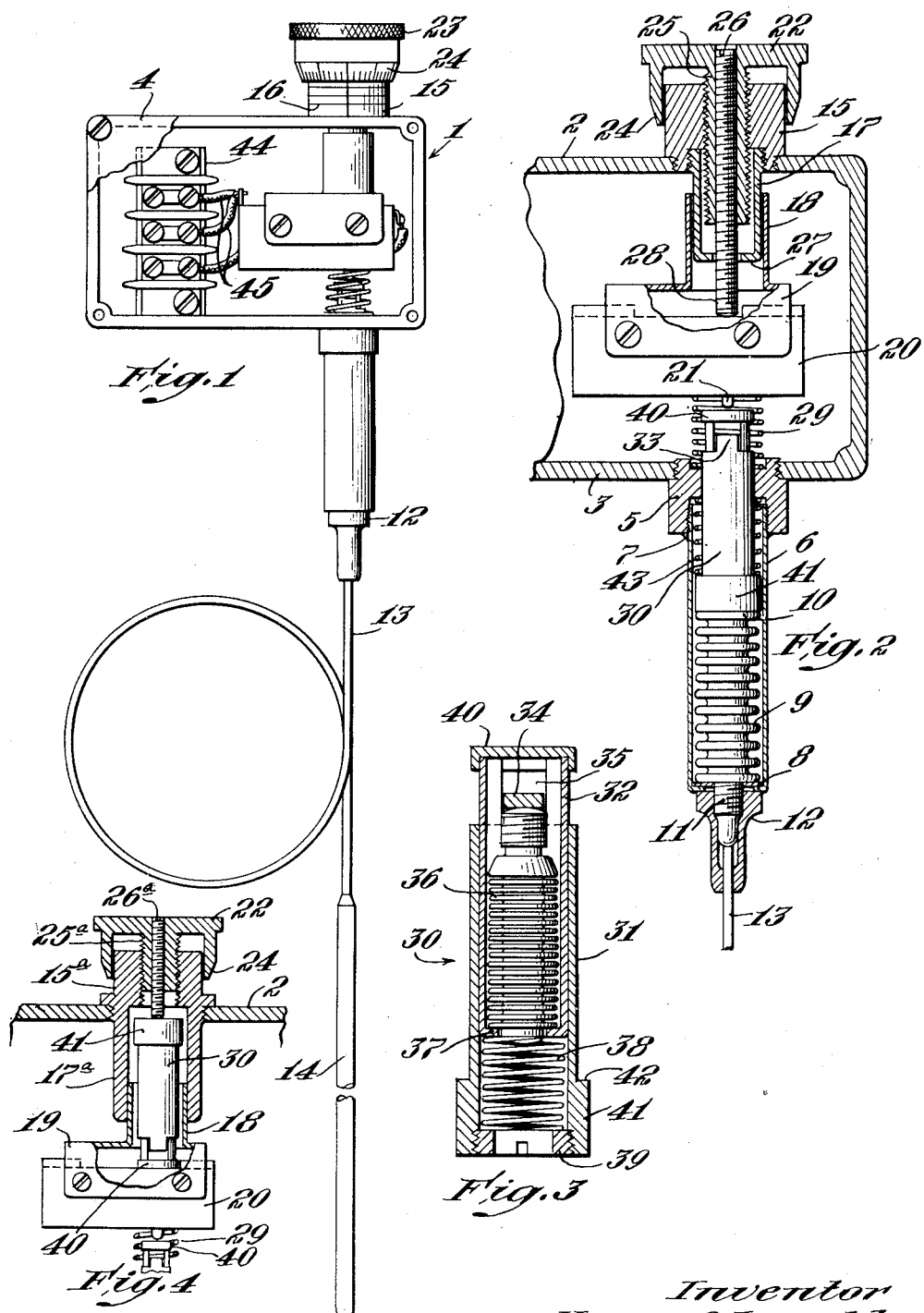

2,395,007

UNITED STATES PATENT OFFICE 2,395,007

AUTOMATIC CIRCUIT CONTROLLER

Henry G. Leupold, Cambridge, Mass., assignor to United Electric Controls Company, South Boston, Mass., a corporation of Massachusetts Application April 10, 1944, Serial No. 530,303

9 Claims. (Cl. 200—83)

This invention relates to instruments of the kind which automatically close or open an electrical circuit in response, for example, to variations in temperature or pressure. Thermostats, pressurestats, etc., are cited as specific instances of such instruments. The instrument herein chosen for illustrative embodiment is a thermostat of the remote control type. In the illustrated instrument the switch and the immediate means for operating it may be at a very substantial distance from the body whose temperature determines the actuation of the switch. For example, the instrument itself may be in one room of a building and the body of material whose temperature determines the actuation of the switch, may be in another room.

In the operation of remote control thermostats such as just referred to, the temperature of the ambient air in the room or compartment in which the switch is located may vary widely from time to time, and since the instrument case houses the immediate switch-actuating motor means, the latter is subject to these variations in ambient temperature and thus the operation of the apparatus as a whole may be undesirably modified by these unpredictable temperature changes. One object of the present invention is to provide an instrument of this general type which is simple in design, contains no delicate mechanisms, which can withstand vibration, shocks, and moisture conditions, which is accurate and compact, and which is arranged automatically to compensate for changes in the temperature of the medium surrounding the instrument proper.

Instruments of this general class are customarily designed to permit adjustment of the temperature at which the circuit will be closed or opened, but most such prior instruments, so far as is known to me, have been inadequate in so far as accuracy, delicacy and certainty of adjustment is concerned, and have usually been limited to a rather narrow range. A further object of the present invention is to provide an instrument of this class which is adjustable over a wide range and in a most precise way by a micrometric adjustment and with provision for initial calibration, and such that accurate adjustment throughout the entire range may be made by mere rotation of a manually actuable part. A further object is to provide an instrument of this type which is very rapid in its response to temperature changes and which employs a snap acting switch, and, as the switch operating motor, a metallic bellows connected by a substantially non-expansible tube to a bulb of substantially constant volume, the bellows, bulb and tube being solidly filled with liquid thereby providing, by hydraulic action, substantially equal variation in the length of the bellows for each degree of change in temperature.

In some instances it may be desirable to maintain a temperature differential between the temperature of the space wherein the instrument proper is located and the switch-actuating temperature of the bulb. A further object is to provide an instrument of this kind having a provision for automatically maintaining such a temperature differential.

Other and further objects and advantages of the invention will be set forth in the following more detailed description and by reference to the accompanying drawing wherein Fig. 1 is a front elevation of the entire instrument with certain parts broken away;

Fig. 2 is a fragmentary section to larger scale than Fig. 1 and with certain parts broken away, showing details of the instrument;

Fig. 3 is a vertical section, to still larger scale, illustrating the means for compensating the switch-actuating motor for variations in ambient temperature; and Fig. 4 is a fragmentary view similar to Fig. 2, illustrating an arrangement wherein further provision is made for automatically maintaining a temperature differential.

Referring to the drawing, the numeral 1 designates the case of the instrument. This case may be of any appropriate material, for example pressed metal or a moulded plastic composition. As here illustrated, the case is substantially rectangular and has the top wall 2, the bottom wall 3, and a removable front cover plate 4. The bottom wall 3 is furnished with a screw-threaded opening which receives a plug 5 having an axial bore which is enlarged at its lower end and internally screw threaded for the reception of the upper end of the rigid tubular leg member 6. Preferably the leg member 6 is of thin material and is welded at 7 to the plug 5. The plug and leg member, when in assembled relation with the wall 3, constitute a portion of the instrument case. The lower end of the leg member 6 is provided with an inwardly directed annular flange 8, which forms a seat or abutment for the lower end of a pressure motor 9, here illustrated as an expansible metallic bellows. This bellows has an interior chamber of variable volumetric capacity and closed at its upper end by a wall 10, which moves up and down in response to variations in fluid pressure within the bellows. The lower end of the bellows is provided with a downwardly directed nipple portion 11, externally screw threaded for engagement by a clamping nut 12 whereby the lower end of the bellows device is securely fixed to the flange 8. The nut 12 is furnished with an axial bore through which passes the capillary tube 13 fixed at one end to the nipple 11 and which is connected at its opposite end to a bulb 14 which may be of metal or other suitable material and which is preferably of substantially constant volume. The tube 13 may be of any desired length such, for example, that the instrument 1 may be located at a convenient point for observation and adjustment, while the bulb may be located at a remote place and in intimate contact with a body, either solid or fluid, whose temperature variations cause operation of the instrument. The bulb 14, the tube 13 and the chamber of the motor device 9, are all preferably filled with a liquid such that pressure changes in the bulb 14 due to temperature variations to which the bulb is exposed, are transmitted hydraulically to the motor 9 and thus cause corresponding movement of the wall 10 of the motor device.

The top wall 2 of the case of the instrument is furnished with a threaded opening (in axial alignment with the opening which receives the plug 5) which receives a cylindrical plug 15 which is preferably peripherally graduated as shown at 16, for instance, so that the distance between adjacent graduations represents a difference of one hundred degrees of temperature. The plug 15 has an axial bore whose lower end is enlarged and screw threaded for the reception of the upper end of a rigid, tubular fixed guide 17, the plug 15 and the guide 17 when assembled with the wall 2 of the casing constituting a portion of the casing. A tubular, movable guide member 18 is arranged for telescopic engagement with the fixed guide 17 and is attached to or integral with a switch carrier 19 to which is secured the casing of an electrical switch 20. This switch is preferably of the snap action type, for example a switch of the kind known to the trade as a "Mu" switch, and has an operating pin 21, here shown as downwardly directed—movement of the pin in an axial direction determining the relative position of the switch contacts. The switch 20 is so located in its holder or carrier 19 that the pin 21 is axially aligned with the plug 5.

A rotary micrometer cap 22 is arranged for co-operation with the cylindrical plug 15, this cap preferably having a knurled rim 23 (Fig. 1) to facilitate its manual rotation, and having a beveled and graduated lower edge 24, the graduations of which may, for example, indicate single degrees of temperature. The cap 22 is provided with a downwardly directed tubular boss 25 (Fig. 2) which is screw threaded both externally and internally. The external screw threads are of fine pitch and engage corresponding internal threads formed in the bore of the plug 15, the pitch of the threads being such for example that a single complete rotation of the cap 22 moves the lower edge of the cap up or down a distance equal the distance between adjacent graduations 16 on the periphery of the plug 15. An elongate abutment screw 26 has threaded engagement with the threaded bore of the elongate boss 25. The screw 26 is of such length as to project downwardly below the lower end of the boss 25 and through a central aperture in a flange 27 at the lower end of the fixed guide 17 and has its lower end 28 in engaging contact with the upper surface of the case of the switch 20. A coiled compression spring 29, having its lower end seated in a recess in the upper end of the plug 5, constantly bears against the lower wall of the switch casing and urges the switch casing upwardly so as to maintain contact between the switch casing and the lower end of the abutment screw 28. The abutment screw 28 transmits motion from the micrometer cap 22 to the switch, so that, by turning the micrometer cap, the switch may be moved bodily downwardly in opposition to the spring 29. Adjustment of the screw 26 relatively to the cap 22 is utilized for calibrating the instrument.

A terminal support 44 is arranged within the casing and flexible conductors 45 extend from the switch case 20 to terminals on the support. The case or its cover 4 may have a suitable opening or openings (not shown) for the admission of electrical connections.

In accordance with the present invention, a temperature-compensating device 30 (Figs. 2 and 3) is preferably interposed between the movable wall 10 of the motor device and the switch pin 21. This temperature-compensating means, in the present instance, constitutes the motion-transmitting means whereby movement of the wall 10 of the motor is transmitted to the pin 21. As illustrated in Fig. 3, the temperature-compensating means comprises an outer, tubular element 31 and an inner tubular element 32 having telescopic engagement with the outer element 31. The outer element is provided at its upper end with integral diametrically opposite upward extensions 33 which are united by a transversely extending rigid bridge member or abutment 34. The inner tubular member 32 is provided at its upper end with diametrically opposite, elongate slots 35 for the accommodation of the bridge member or abutment 34, so that the inner member 32 may slide relatively to the outer member without interference from the abutment 34. Within the inner tubular element 32 there is arranged a closed, temperature responsive, expansible-contractible fluid filled capsule 36, here illustrated as a metallic bellows having at its upper end a rigid plug which engages the abutment member 34 and having at its lower end a rigid plug which fits within an opening in an annular flange 37 at the lower or inner end of the inner tubular element 32. A coiled compression spring 38 bears at its upper end against the flange 37 and at its lower end against a screw-threaded annular abutment 39 having threaded engagement with the lower end portion of the outer tubular element 31. The lower part 41 of this outer element 31 is of a diameter greater than its body portion, thus providing a shoulder 42 constituting an abutment for one end of a coiled compression spring 43 (Fig. 2) which embraces the body of the element 31 and whose upper end engages the bottom of the recess in the plug 5 which houses the upper end of the tubular leg 6. The upper end of the inner tubular element 32 is preferably provided with a closure cap 40 which constitutes the actuating element whereby the switch pin 21 is moved.

In the operation of this device, and assuming that the micrometer cap 22 has been adjusted for a given temperature and that in so doing the switch 20 has been moved up or down so as to determine the normal or initial distance between the pin 21 and the actuator 40, an increase in temperature at the bulb 14 will result in an upward movement of the movable wall 10 of the pressure motor 9, and a corresponding upward motion of the actuator element 40. Dependent upon the initial distance between the pin 21 and the actuator 40, the rise in temperature at the bulb 14 may continue through a greater or lesser interval until eventually the actuator 40 contacts the pin 21 and thus operates the switch contacts to close or open the circuit as the case may be so as thereby indirectly to cause a reduction in the temperature of the surroundings of the bulb 14.

Since the instrument 1 may be located at a substantial distance from the bulb 14, and since the temperature of the ambient air at the location of the instrument may vary very substantially, and differently from the temperature at the location of the bulb 14, the pressure motor 9 might, except for the provision of the compensator 30, be affected by such temperature changes in the air surrounding the case 1 and so as to interfere with the accuracy of the instrument. The temperature-compensating device 30 of the present invention is so devised that upon increase in temperature of the air at the location of the instrument, the capsule 36 will increase in length. Such increase in length of the capsule pushes the inner member 32 downwardly relatively to the outer member 31, thus decreasing the effective length of the device 30, that is to say, the effective length of the motion-transmitting means between the wall 10 of the motor and the pin 21. By the selection of a capsule 36 having the proper temperature response, the device may be accurately compensated for temperature changes in the vicinity of the instrument, so that regardless of the temperature of the surroundings of the instrument, temperature changes at the bulb 14 will be accurately transmitted as pressure variations to the motor 9 and will result in a corresponding accurate operation of the switch.

Under some conditions it is desirable to maintain a constant differential between the temperature of the room in which the instrument proper is arranged and the switch-operating temperature of the body to which the bulb is exposed. For example, suppose that in a given instance, when the room temperature is 80° the instrument is set to break the circuit at a bulb temperature of 60° with consequent lowering of the temperature of the body to which the bulb is exposed. Under these conditions there is a 20° differential between the room temperature and the switch-actuating temperature. Now if the room temperature were to rise to 85° the switch ordinarily would still operate at 60° bulb temperature to open the circuit, and there would then be a 25° temperature differential. However, by resetting the switch to operate at 65° bulb temperature, the original 20° differential could be restored. Ordinarily the only way of doing this would be by manually resetting with micrometer cap 23. In accordance with the present invention this resetting may be done automatically, the arrangement for so doing being illustrated in Fig. 4. In this arrangement the plug 15 of Fig. 2 is replaced by a tubular member 15ª having screw-threaded engagement with an opening in the top wall 2 of the case and having a downward extension 17ª within the case constituting a fixed guide for cooperation with a tubular telescopic member 18 forming a part of the switch support 19. The micrometer cap 22 has a beveled and graduated lower edge portion 4 which cooperates with graduations, not shown, on the outer peripheral surface of the member 15ª. The cap 22 is also provided with a tubular interior boss 25ª which is externally screw threaded for engagement with internal screw threads at the upper part of the member 15ª, these screw threads being of fine pitch to provide for micrometric adjustment. The cap 22 also carries the axial abutment screw 26ª corresponding to the screw 26 of Fig. 2. However, in this instance the screw 26ª does not directly engage the switch casing, but there is interposed between it and the switch casing a temperature-compensating and motion-transmitting device 30 like that shown in Fig. 3. In this instance the end 41 of the compensating device is arranged to be engaged by the screw 26ª, while the actuator element 40 engages the switch casing. With this arrangement, increase in temperature, for example, in the surroundings of the instrument, causes a decrease in the effective length of the motion-transmitting device 30 just sufficient to maintain the temperature differential between room and bulb temperatures. Thus, regardless of temperature changes in the instrument, the effective setting of the switch resultant from the micrometer screw remains fixed and unchanged. Obviously the instrument may comprise a compensating device, as illustrated in Fig. 2, to compensate for movements of the wall 10 of the pressure motor resultant from temperature changes in the immediate vicinity, and also a compensator 30, as illustrated in Fig. 4, to maintain the desired pressure differential.

Since the member 18 has a close telescoping fit over the tubular fixed guide 17, and since the parts 26, 17, 18, 21 and 40 are all axially aligned, the motion imparted to the switch case and pin 21 is accurately rectilinear. Thus it is possible to employ a micrometer adjustment with the certainty that minute movements of the adjusting means will result in corresponding accurate settings of pin 21.

While desirable embodiments of the invention have been illustrated by way of example, it is to be understood that the invention is not necessarily limited to these precise arrangements but is to be regarded as broadly inclusive of all modifications and substitutions falling within the scope of the appended claims.

I claim:

1. A remote reading instrument of the class described wherein a casing houses an electrical switch having a movable operating pin, the casing comprising a hollow leg projecting outwardly from one of its walls and coaxial with the operating pin, the casing also having an elongate fixed guide carried by its opposite wall and projecting into its interior and which defines a guideway coaxial with the pin, a switch carrier movable along said guideway and to which the switch is secured, a switch actuator engageable with the pin for moving the latter, and a pressure motor for moving the actuator, characterized in that the pressure motor is disposed within the outer portion of said tubular leg, motion transmitting means interposed between the motor and actuator and which includes a temperature-sensitive, fluid-filled capsule also located within said hollow leg, telescopic parts engageable by the respective ends of the capsule, a spring urging the switch away from the actuator, and adjustable stop means for limiting such movement, the motion-transmitting means being so devised and arranged that its effective length varies inversely as the ambient temperature rises and falls.

2. An instrument of the class described wherein a casing houses an electrical switch having a movable operating pin, the casing comprising a hollow leg projecting outwardly from one of its walls and coaxial with the operating pin, the casing also having an elongate fixed tubular guide coaxial with the operating pin and projecting inwardly from the wall of the casing, a switch carrier to which the switch is secured and which comprises a portion slidably engaging said tubular guide, a switch actuator engageable with said operating pin for moving the latter, a switch actuating pressure motor having a movable wall, and motion-transmitting means interposed between said movable wall and the actuator, characterized in that the pressure motor is housed within said hollow leg and in that said motion-transmitting means comprises telescopic members, spring means tending to separate said telescopic members and thereby to increase the effective length of the motion-transmitting means, and a fluid-filled capsule whose length varies in accordance with ambient temperature changes and whose opposite ends abut the telescopic members and which, as it expands, tends to decrease the effective length of the motion-transmitting means, the parts being so designed and arranged that said capsule substantially exactly compensates for the effects of such temperature changes upon the pressure motor, a spring urging the switch away from the actuator, and means associated with said tubular guide for limiting such motion of the switch.

3. Motion-transmitting means for use in an instrument of the class described, said motion-transmitting means comprising a temperature-compensating device including a pair of rigid, telescopic tubular elements, the inner of said elements having an abutment at its inner end, a compression spring bearing at one end against said abutment and its other end against an abutment at the corresponding end of the outer tubular element, the opposite end of the latter tubular element being provided with an abutment which extends transversely of the axis of the inner tubular element, said tubular elements being so constructed and arranged that the inner element may move axially relatively to said transverse abutment, and a closed fluid-filled metallic bellows housed within the inner tubular element, one end of the bellows engaging said transverse abutment and the other end engaging the abutment at the inner end of the inner tubular element, the parts being so constructed and arranged that variation in length of the metallic bellows in response to ambient temperature variations results in an inverse variation in the overall length of the assembled tubular elements.

4. An instrument of the class described having an electrical switch, a switch-actuating pressure motor having a movable wall, motion-transmitting means interposed between said movable wall and the switch, and a casing which houses the switch, characterized in that the motion-transmitting means comprises a temperature-compensating device including a pair of telescopic tubular elements, the inner of said elements having an abutment at its inner end, a compression spring bearing at one end against said abutment and at its other against an abutment element at the outer end of the outer tubular element, said latter tubular element having a rigid transverse abutment at its opposite end, the inner tubular element having a longitudinal slot in its peripheral wall for the accommodation of said transverse abutment, and a closed fluid-filled metallic bellows within the inner tubular element, one end of the bellows engaging said transverse abutment and the other end engaging the abutment at the inner end of the inner tubular element, and a cap at the outer end of the inner element, the parts being so constructed and arranged that variation in length of the metallic bellows, in response to ambient temperature variations, compensates substantially exactly for the effects of said temperature variations upon the pressure motor.

5. An instrument of the class described having a casing which houses an electrical switch provided with a movable operating element, the wall of the casing having an aperture and a plug fixed in said aperture, the plug having a screw-threaded bore, an elongate guide fixed to the inner end of the plug, a switch carrier to which the switch is secured and which has a guide portion arranged for sliding engagement with said fixed guide whereby the switch is constrained to move bodily in a rectilinear path, an actuator for moving said operating element, spring means urging the switch in a direction away from the actuator, and a micrometer screw engaging the bore in the plug and which is operative to move the switch in opposition to the spring toward the actuator.

6. An instrument of the class described comprising an electrical switch of the snap-action type having a rectilinearly movable operating pin, an actuator for moving the pin, means for guiding the switch to move bodily in a direction axial of the pin, resilient means urging the switch in a direction away from the actuator, an abutment member engaging the switch and operative to determine the normal distance between the pin and the actuator, said abutment member being carried by a rotary head and being rotatable by the latter, a fixed internally threaded cylinder having external graduations, the rotary head having an elongate threaded boss engaging an internally screw-threaded bore of said cylinder, the head being peripherally graduated for cooperation with the graduations on the cylinder.

7. An instrument of the class described comprising an electrical switch of the snap-action type having a rectilinearly movable operating pin, an actuator for moving the pin, means for guiding the switch to move bodily in a direction axial of the pin, resilient means urging the switch in a direction away from the actuator, an elongate abutment screw whose end engages the switch and which is operative to determine the normal distance between the pin and actuator, a micrometer head having an elongate tubular boss screw threaded internally and externally, and a fixed cylinder having an internally screw-threaded bore for engagement with the external screw threads on said boss, the cylinder and head having cooperating micrometer graduations, the abutment screw having threaded engagement with the internal threads of said elongate boss whereby the screw may be adjusted relatively to the head for calibration of the instrument.

8. An instrument of the class described wherein a casing houses an electrical switch having a movable operating pin, the casing comprising means defining a motor chamber, a metallic bellows, having a movable end wall and which constitutes a pressure motor, disposed within said motor chamber and coaxial with the switch pin, the casing also having means defining a guideway coaxial with the switch pin, a switch carrier movable along said guideway and to which the switch is secured, a switch actuator engageable with the switch pin for moving the latter, switch-operating means including a bulb, a tube connecting the bulb with the interior of the metallic bellows, a body of liquid filling the bulb, tube and bellows, and means for transmitting motion from the movable wall of the bellows to the switch, characterized in that said motion-transmitting means comprises a closed fluid-filled metal bellows also housed within said motor chamber, a spring urging the switch away from the actuator, and adjustable stop means limiting such motion of the switch.

9. An instrument of the class described having an electrical switch, a switch-actuating pressure motor having a movable wall, motion-transmitting means interposed between said movable wall and the switch, and a casing which houses the switch, characterized in that the casing comprises means defining a motor chamber within which the pressure motor is located, the motion-transmitting means including a tubular casing of variable length, a portion at least of which is located within said motor chamber, a spring within the motor chamber tending to hold the tubular casing in contact with the movable wall of the motor, and temperature-responsive means within said tubular casing operative to vary the length of said casing inversely with changes in the ambient temperature.

HENRY G. LEUPOLD.